(12) United States Patent
Penain et al.

(10) Patent No.: US 7,020,199 B2
(45) Date of Patent: Mar. 28, 2006

(54) METHOD AND APPARATUS FOR PROCESSING MPEG DATA

(75) Inventors: Stephane Penain, Villecresnes (FR); Jean-Christophe Seguy, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 10/032,992

(22) Filed: Dec. 26, 2001
(Under 37 CFR 1.47)

(65) Prior Publication Data

US 2003/0169826 A1  Sep. 11, 2003

(30) Foreign Application Priority Data

Dec. 28, 2000  (FR)  .................................. 00 17209

(51) Int. Cl.
*H04N 11/02* (2006.01)

(52) U.S. Cl. ............ 375/240.16; 375/295; 375/240.12; 375/240.15; 375/240.03; 370/438; 382/239; 718/101; 704/201; 710/306; 710/100; 711/100

(58) Field of Classification Search ................ 375/295, 375/240.12, 240.16, 240.03, 240.15; 370/438; 382/239; 704/201; 341/51; 710/100, 306; 711/100; 718/101
See application file for complete search history.

(56) References Cited

U.S. PATENT DOCUMENTS

| | | | | |
|---|---|---|---|---|
| 4,782,481 A | * | 11/1988 | Eaton | 370/438 |
| 5,283,646 A | * | 2/1994 | Bruder | 375/240.12 |
| 5,455,578 A | * | 10/1995 | Bhandari | 341/51 |
| 5,553,302 A | | 9/1996 | Morrissey et al. | 395/825 |
| 5,596,674 A | * | 1/1997 | Bhandari et al. | 704/201 |
| 5,778,099 A | * | 7/1998 | Suzuki | 382/239 |
| 5,982,439 A | * | 11/1999 | Parke | 375/240.16 |
| 6,466,620 B1 | * | 10/2002 | Lee | 375/240.03 |
| 6,831,950 B1 | * | 12/2004 | Penain et al. | 375/240.12 |

FOREIGN PATENT DOCUMENTS

EP  0940758 A2  8/1999

* cited by examiner

*Primary Examiner*—Stephen Chin
*Assistant Examiner*—Sudhanshu C. Pathak

(57) ABSTRACT

A data processing device, for example, an MPEG decoder, comprises a bus system [BUS] over which a transmitter circuit, for example a variable length decoder circuit [VLD], can transfer a series of samples to a receiver circuit, for example an Inverse Scanning [IS] circuit. The transmitter circuit is arranged for transmitting only a start of the series of samples which extends up to a point where the samples that are left are equal to a reference value and for transmitting an indication "end of transmission" after the last transmitted sample. The receiver circuit is arranged for placing the reference values after the sample preceding the indication "end of transmission", so as to reconstitute the series of samples.

2 Claims, 1 Drawing Sheet

METHOD AND APPARATUS FOR PROCESSING MPEG DATA

The invention relates to the transfer of a series of data. The invention may be applied in, for example, a coder or an MPEG decoder (MPEG is the abbreviation of the English expression Motion Picture Expert Group).

An MPEG decoder comprises inter alia the following functions: variable length decoding (VLD), inverse scanning (IS), inverse quantification (IQ), inverse discrete cosine transformation (IDCT) and motion compensation (MC). These functions typically process blocks of 8 times 8 samples. It is possible to design a decoder which comprises a circuit dedicated to each of these functions. Thus, there is a VLD circuit, an IS circuit, an IQ circuit, an IDCT circuit and an MC circuit. Such a decoder comprises a bus system which connects these circuits. Thus the VLD circuit can transfer a block of 8 times 8 samples to the IS circuit or the IQ circuit across the bus system. The transfer of a block may be effected in the form of a series of 64 samples.

It is an object of the invention to permit implementations at relatively low cost.

According to the invention a data processing device comprising a bus system across which a transmitter circuit, for example, a VLD circuit, can transfer a series of samples to a receiver circuit, for example, an IS circuit, comprises the following characteristics. The transmitter circuit is arranged for transmitting only a start of the series of samples which extends to a point where the samples that remain are equal to a reference value and for transmitting an indication "end of transmission" after the sample transmitted last. The receiver circuit is arranged for placing reference values after the sample preceding the indication "end of transmission" so as to reconstitute the series of samples.

Thus, the transmitter circuit transmits only part of a series of samples across the bus system when the series contains reference values at the end. The reference values which form the tail of the series are not transmitted. With respect to this it should be noted that a series of 64 samples coming from a VLD circuit and intended for an IS circuit or an IQ circuit, typically contains a line of relatively large reference values. Thus the invention permits to reduce the load of the bus system in terms of number of data to be transferred per unit of time. In consequence, the invention permits the use of a bus system which has a narrower passband. The narrower the passband is, the less costly the bus is. In consequence, the invention permits implementations at relatively low cost.

These and other aspects of the invention are apparent from and will be elucidated, by way of non-limitative example, with reference to the embodiment(s) described hereinafter.

FIG. 1 illustrates an MPEG decoder. The MPEG decoder comprises a variable length decoder [VLD], an inverse scanning and quantification circuit [IS/IQ], an inverse discrete cosine transformation circuit [IDCT], a motion compensation circuit [MC], a memory [MEM] and a bus [BUS].

The MPEG decoder roughly operates as follows. The variable length decoder [VLD] receives a series of codes of variable length from the memory [MEM] and deduces therefrom a block of 8 times 8 quantified coefficients. The variable length decoder [VLD] transfers the block of 8 times 8 quantified coefficients to the inverse scanning and quantification circuit [IS/IQ] across the bus [BUS]. The inverse scanning and quantification circuit [IS/IQ] transforms the block of 8 times 8 quantified coefficients into a block of 8 times 8 normal coefficients. The inverse scanning and quantification circuit [IS/IQ] transfers the block of 8 times 8 normal coefficients to the inverse discrete cosine transformation circuit [IDCT] across the bus [BUS]. The inverse discrete cosine transformation circuit [IDCT] transforms the block of 8 times 8 quantified coefficients into a block of 8 times 8 pixels. The inverse discrete cosine transformation circuit [IDCT] transfers the block of 8 times 8 pixels to the motion compensation circuit [MC] across the bus [BUS]. The motion compensation circuit [MC] and other circuits (not shown) carry out operations for obtaining a decoded image.

Figure 1:
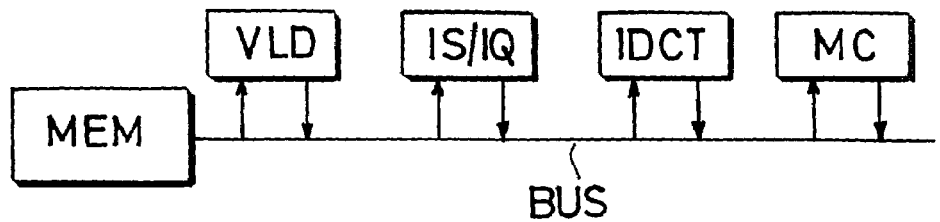
FIG. 1 is a block diagram illustrating an MPEG decoder.
Figure 2:
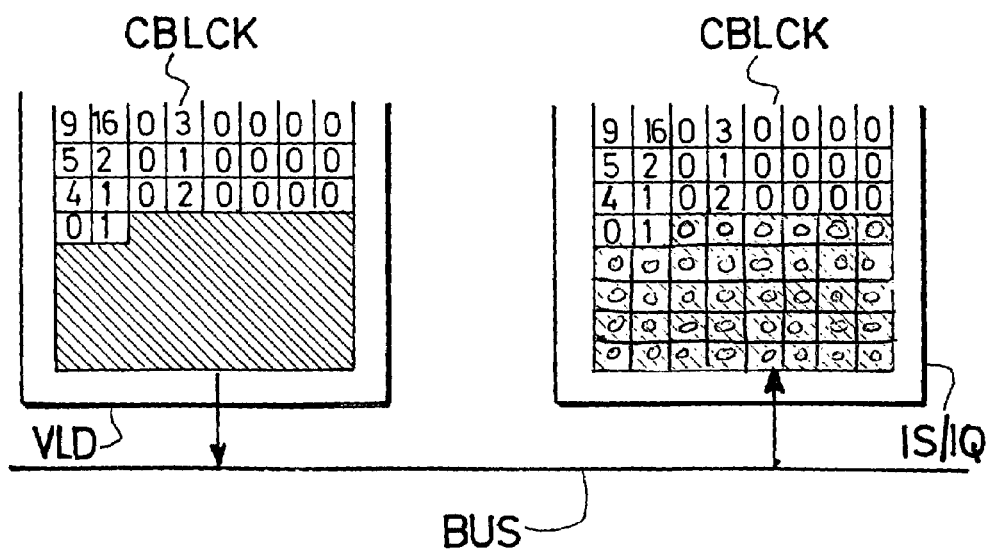
FIG. 2 is a concept diagram illustrating a transfer of samples in the MPEG decoder.

FIG. 2 illustrates the transfer of a block of 8 times 8 quantified coefficients [CBLCK] from the variable length decoder [VLD] to the inverse scanning and quantification circuit [IS/IQ] across the bus [BUS]. The quantified coefficients are represented by small squares. A black square represents a quantified coefficient whose value is equal to zero (0). A white square represents a quantified coefficient whose value is specified inside the square.

The block of 8 times 8 quantified coefficients [CBLCK] is transferred over the bus [BUS] in the form of a series of values. Actually, the variable length decoder [VLD] carries out a scanning of the block of 8 times 8 quantified coefficients [CBLCK] line by line and from left to right for converting the block into a series of values. The scanning is stopped at the first black square that is met. Thus the result of the scanning is the following series of values: 9, 16, 0, 3, 0, 0, 0, 0, 5, 2, 0, 1, 0, 0, 0, 0, 4, 1, 0, 2, 0, 0, 0, 0, 0, 1. The variable length decoder [VLD] transmits this series of values and, at the end of the series, it transmits an indication "end of transmission".

The inverse scanning and quantification circuit [IS/IQ] comprises an input memory for storing the block of 8 times 8 quantified coefficients [CBLCK]. The inverse scanning and quantification circuit [IS/IQ] fills this internal memory with values which are equal to zero (0) before the transmission of the variable length decoder [VLD] is received. During the reception of the transmission from the variable length decoder [VLD], the inverse scanning and quantification circuit [IS/IQ] carries out a scanning which is identical to the scanning carried out by the variable length decoder [VLD] for transmitting the block of 8 times 8 quantified coefficients [CBLCK]. The scanning is stopped at the indication "end of transmission". At this indication the scanning has arrived at the first black square. There it stops. The block of 8 times 8 quantified coefficients [CBLCK] is now present in the internal memory of the inverse scanning and quantification circuit [IS/IQ].

The above description with reference to the various Figures illustrates rather than limits the invention. It is evident that there are a number of alternatives which remain within the scope of the appended drawings. With respect thereto, several remarks are made in conclusion.

There are many ways of implementing functions by means of items of hardware or software, or a combination of the two. With respect thereto, the Figures are highly diagrammatic, each Figure representing only one embodiment. But although a Figure shows various functions in the form of separate blocks, this does not exclude at all that a single item of hardware or software carries out various functions. Nor does this exclude that a function can be carried out by a set of items of hardware or software.

No reference sign in brackets in any claim should be interpreted in a limiting fashion. The word "comprising" does not exclude the presence of other elements or steps sated in a claim. The word "a" or "an" preceding an element or a step does not exclude the presence of a plurality of these elements or these steps.

The invention claimed is:

1. A data processing device comprising a bus system across which a transmitter circuit can transfer a series of samples to a receiver circuit, characterized in that:
   the transmitter circuit is arranged for transmitting only a start of the series of samples which extends to the point where all the sample that remain in a transfer block, are equal to a reference value and for transmitting an indication "end of transmission" after the last transmitted sample;
   the receiver circuit is arranged for placing reference values after the sample preceding the indication "end of transmission," so as to reconstitute the series of samples.

2. A method of transferring a series of samples from a transmitter circuit to a receiver circuit, characterized in that the method comprise the following steps;
   a transmission step in which the transmitter circuit transmits only a start of the series of samples which extends to the point where all the samples that remain, in a transfer block, are equal to a reference value and for transmitting an indication "end of transmission" after the last transmitted sample;
   a receiving step in which the receiver circuit places reference values after the sample preceding the indication "end of transmission," so as to reconstitute the series of samples.

* * * * *